(12) United States Patent
Bikumala et al.

(10) Patent No.: US 11,574,016 B2
(45) Date of Patent: Feb. 7, 2023

(54) SYSTEM AND METHOD FOR PRIORITIZATION OF SUPPORT REQUESTS

(71) Applicant: Dell Products L. P., Round Rock, TX (US)

(72) Inventors: Sathish Kumar Bikumala, Round Rock, TX (US); Marcio Fragoso Stumpf Lena, Porto Alegre (BR); Deepak Nagarajegowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 439 days.

(21) Appl. No.: 16/778,013

(22) Filed: Jan. 31, 2020

(65) Prior Publication Data
US 2021/0240774 A1 Aug. 5, 2021

(51) Int. Cl.
| | | |
|---|---|---|
| *G06F 16/9032* | (2019.01) | |
| *G06F 9/451* | (2018.01) | |
| *G06N 3/08* | (2023.01) | |
| *G06N 20/00* | (2019.01) | |
| *H04L 41/16* | (2022.01) | |
| *H04L 41/5074* | (2022.01) | |

(52) U.S. Cl.
CPC ........ *G06F 16/90332* (2019.01); *G06F 9/453* (2018.02); *G06N 3/08* (2013.01); *G06N 20/00* (2019.01); *H04L 41/16* (2013.01); *H04L 41/5074* (2013.01)

(58) Field of Classification Search
None
See application file for complete search history.

(56) References Cited

U.S. PATENT DOCUMENTS

| | | | | |
|---|---|---|---|---|
| 2019/0158366 | A1* | 5/2019 | Higgins | G10L 25/63 |
| 2020/0258013 | A1* | 8/2020 | Monnett | G06Q 10/06 |
| 2020/0310842 | A1* | 10/2020 | Yen | G06F 9/453 |
| 2021/0097551 | A1* | 4/2021 | Tzur | G06N 20/20 |

* cited by examiner

*Primary Examiner* — Antim G Shah
(74) *Attorney, Agent, or Firm* — Krishnendu Gupta; Deepika Bhayana; Lesley A. Leonessa

(57) ABSTRACT

Methods, information handling systems and computer readable media are disclosed for determining a priority score for a pending support request document. According to one embodiment, a method includes receiving current support request information from within a pending support request document and accessing current additional information associated with the pending support request document. The method further includes associating a set of parameter values with the pending support request document, wherein the values within the set of parameter values are based on information within one or both of the current support request information or the current additional information. The method continues with determining a priority score corresponding to the set of parameter values, where determining the priority score comprises applying a machine learning model developed using previous support request information and previous additional information associated with previously-resolved support request documents, and assigning the priority score to the pending support request document.

14 Claims, 7 Drawing Sheets

SYSTEM AND METHOD FOR PRIORITIZATION OF SUPPORT REQUESTS

BACKGROUND

The present disclosure relates generally to networked information handling systems, and more particularly to automated prioritizing of incoming support requests.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As noted above, networked information handling systems may be used for communications between users of the systems. In particular, requests for assistance or support may be sent between information handling systems. A large organization, or "enterprise," may receive thousands of support requests or "tickets" per day. Some tickets should be addressed before others, depending on multiple factors which might include, for example, severity of the problem reflected by the ticket, importance of the entity submitting the ticket, or contractual obligations dictating support response time. Factors affecting a ticket's priority may involve sensitive information not available to the support personnel initially receiving a ticket. The factors may also vary with time, so that a given ticket could appropriately have different priorities if received on different days.

SUMMARY

Methods, information handling systems and computer readable media are disclosed for determining a priority score for a pending support request document. According to one embodiment, a method includes receiving current support request information from within a pending support request document and accessing current additional information associated with the pending support request document. The method further includes associating a set of parameter values with the pending support request document, wherein the values within the set of parameter values are based on information within one or both of the current support request information or the current additional information. The method continues with determining a priority score corresponding to the set of parameter values, where determining the priority score comprises applying a machine learning model developed using previous support request information and previous additional information associated with previously-resolved support request documents, and assigning the priority score to the pending support request document.

The foregoing is a summary and thus contains, by necessity, simplifications, generalizations and omission of detail; consequently those skilled in the art will appreciate that the summary is illustrative only and is not intended to be limiting. Other aspects, inventive features, and advantages, as defined solely by the claims, will become apparent in the non-limiting detailed description set forth below.

BRIEF DESCRIPTION OF THE DRAWINGS

Embodiments of methods and systems such as those disclosed herein may be better understood, and their numerous objects, features, and advantages made apparent to those skilled in the art by reference to the accompanying drawings. For ease of discussion, the same reference numbers in different figures may be used to indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1:
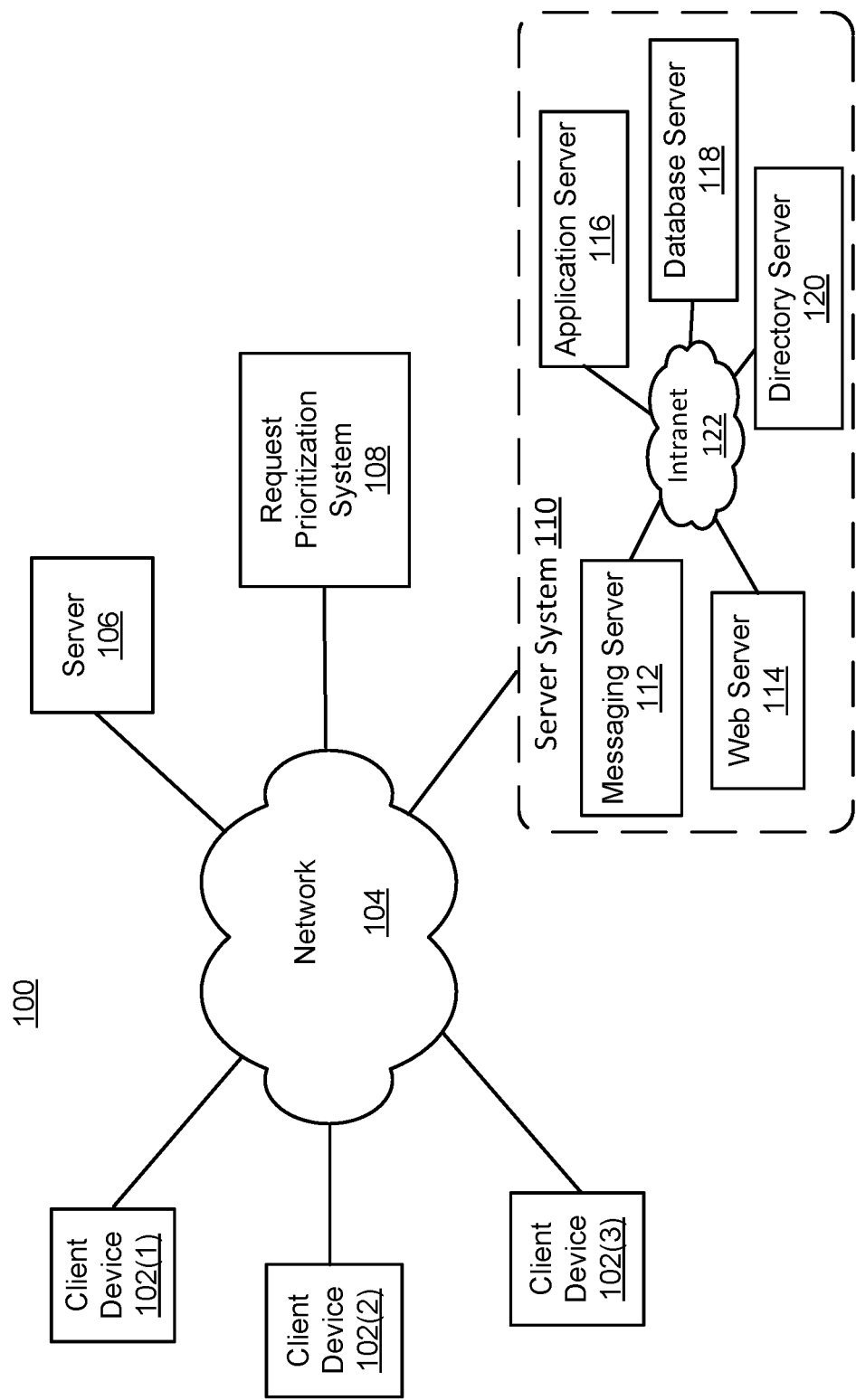
FIG. 1 is a simplified block diagram illustrating an example of a network environment including multiple information handling systems, and suitable for implementing embodiments of the present disclosure.

A network environment 100 including multiple networked information handling systems is shown in FIG. 1. In the embodiment of FIG. 1, client computing devices 102 (1)-(3), server computing device 106, request prioritization system 108, and server system 110 are communicatively coupled to one another via network 104. Client computing devices 102(1)-(3), server 106 and request prioritization system 108 are embodiments of information handling systems as described above and elsewhere herein, and may take any of the various forms described, including personal computers, tablet computers, smartphones, or blade or rack devices, as appropriate.

In an embodiment, a client device 102 in communication with request prioritization system 108 represents a device used to submit a support request ticket, or support request document, to system 108. In a further embodiment, request prioritization system 108 is operated by or on behalf of a provider of a product or service. Possible entity forms for such a provider may include, for example, companies, utilities, government officials or agencies, and charitable organizations. A client device 102 in such an embodiment may be owned or operated by users of the provider's product or service. Depending on the nature of the provider, these users may have roles including but not limited to customers, consumers, clients, constituents or employees with respect to the provider.

A client device 102 can also represent a device used in resolving a support request, such as a device operated by a support analyst for the provider operating prioritization system 108. In embodiments described in this disclosure, incoming support request tickets are first assigned a priority value or score by request prioritization system 108 before being addressed by support request personnel. In a further embodiment, pending support request tickets are sorted into a prioritized list by system 108, so that they can be addressed by support personnel in order of priority. In embodiments for which support personnel are organized into tiers or levels, with personnel at higher levels having increased experience or expertise, support tickets may also be distributed initially to different levels of support personnel based on relative priority score. The automated prioritization provided by system 108 allows for a more accurately prioritized ticket resolution sequence than can be obtained by first-level support personnel using a triage method. In an embodiment, information associated with a pending support ticket request and accessed by request prioritization system 108 is information that is not available to support personnel, such as sensitive financial and contract-related information. As compared to existing static rules-based prioritization solutions, system 108's updatable machine learning model is more adaptable to time variation of information associated with a support ticket.

As noted above, an information handling system may include an aggregate of instrumentalities. For example, as used in this disclosure, "server" may include a server system such as server system 110, where a server system includes multiple networked servers configured for specific functions. As an example, server system 110 includes a messaging server 112, web server 114, application server 116, database server 118 and directory server 120, interconnected with one another via an intranet 122. Network 104 includes one or more networks suitable for data transmission, which may include local area networks (LANs), wide area networks (WANs), storage area networks (SANs), the Internet, or combinations of these. In an embodiment, network 104 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards. Intranet 122 is similar to network 104 except for being, typically, private to the enterprise operating server system 110.

Figure 2:
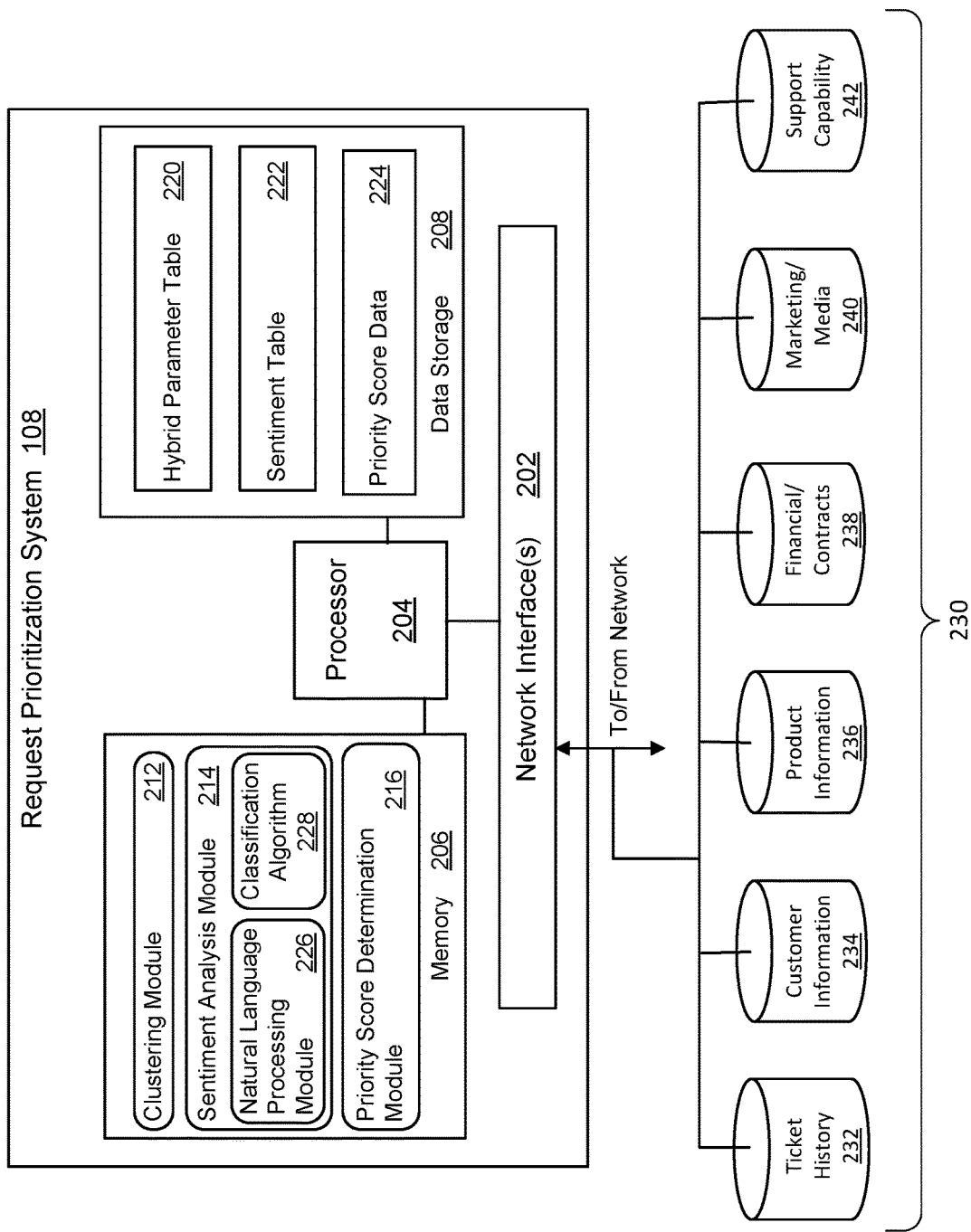
FIG. 2 is a simplified block diagram illustrating certain components of an embodiment of an information handling system configured as a request prioritization system, according to an embodiment of the present disclosure.

A block diagram illustrating certain components of an embodiment of request prioritization system 108 is shown in FIG. 2. Although illustrated as a single device in FIG. 2, the request prioritization system disclosed herein may also be implemented as a server system similar to server system 110 of FIG. 1. In the embodiment of FIG. 2, request prioritization system 108 includes one or more network interfaces 202, a processor 204, memory 206 and data storage 208. Memory 206 stores program instructions that when executed by processor 204 implement a clustering module 212, a sentiment analysis module 214 and a priority score determination module 216. Data storage 208 is configured to store hybrid parameter table 220, sentiment table 222 and priority score data 224. In most embodiments described herein, a provider of system 108 is an enterprise-level company and a submitter of a support request ticket is a customer of the company, but the methods and systems described are applicable to other types of providers and request submitters.

Network interface 202 is configured for both sending and receiving of data and control information within a network. In an embodiment, network interface 202 comprises multiple interfaces and can accommodate multiple communications protocols and control protocols. Memory 206 includes a plurality of memory locations addressable by processor 204 for storing program instructions and data used in program execution. As such, memory 206 may be implemented using any combination of volatile or non-volatile memory, including random-access memory (RAM) and read-only memory (ROM). In an embodiment, memory 206 is system memory for processor 204. Data storage 208 includes one or more integrated or peripheral mass storage devices, such as magnetic disks, optical disks, solid state drives or flash drives. In other embodiments, or at other times during operation of the embodiment of FIG. 2, some or all of the instructions shown in memory 206 may be stored in data storage 208, and some or all of the data shown in data storage 208 may be stored in memory 206.

Clustering module 212 is configured to determine values of a hybrid parameter that can be associated with a support ticket, where a hybrid parameter as used herein refers to a parameter derived by applying a clustering algorithm to parameter values associated with a population to be described by the hybrid parameter. In an embodiment, the population is the set of customers that have submitted support request tickets to the provider operating request prioritization system 108. Typically, the hybrid parameter is derived from multiple parameters describing members of the target population, using a multi-dimensional clustering algorithm. In an embodiment, for example, a hybrid parameter relating to customer importance or urgency may be obtained by applying a clustering algorithm to values for parameters relating to the number of products a customer has purchased from the enterprise and the number of support requests the customer has made per product, over a population of customers that have historically submitted support requests. An embodiment of a method carried out by clustering module 212 is described below in connection with FIG. 3.

Sentiment analysis module 214 is configured to determine a sentiment value for a support request ticket, where the sentiment value is a characterization of an estimated attitude of the customer submitting the ticket, based on language in the ticket. In the embodiment of FIG. 2, module 214 includes a natural language processing module 226 and a classification algorithm 228. An embodiment of a method carried out by sentiment analysis module 214 is described below in connection with FIG. 4. Priority score determination module 216 is configured to determine a priority score for a pending support request ticket. In an embodiment, module 216 obtains data including data from the support request ticket, data associated with the ticket from associated information stores 230, a hybrid parameter value for the ticket from clustering module 212, and a sentiment value for the ticket from sentiment analysis module 214. In a further embodiment, module 216 includes a machine learning model developed and trained using data from previously-resolved support request tickets, and information associated with those tickets. An embodiment of a method carried out by priority score determination module 216 is described below in connection with FIG. 5.

Hybrid parameter table 220 stored in data storage 208 is a data structure storing hybrid parameter values resulting from operation of clustering module 212. As an example, the hybrid parameter for customer importance or urgency described above can have a set of values corresponding to a level of importance or urgency, where the values correspond to clusters of customers identified by the clustering algorithm. These values could be represented by numerical labels (tier 1, tier 2, etc.), symbolic words ("gold", "silver", etc.) or any other suitable label. In this example, table 220 could contain a list of identifiers of customers for which the clustering algorithm was performed and the hybrid parameter value associated with each customer identifier. In an embodiment, the clustering algorithm is not run each time a new support request ticket is received. Instead, the clustering algorithm is run once per day (or other suitable interval) to account for changes over time in the data to which the clustering algorithm is applied. In such an embodiment, hybrid parameter table 220 is accessed in order to assign a hybrid parameter value to each support request ticket when it is received. In some embodiments, the data in table 220 is stored as a part of a set of customer, ticket and product data maintained for use by priority score determination module 216.

Sentiment table 222 is a data structure storing sentiment values resulting from operation of sentiment analysis module 214. In an embodiment, sentiment values are represented by labels such as "happy," "sad" or "average." Table 222 contains identifiers of previously-analyzed support request tickets and a sentiment value associated with each ticket. In some embodiments, the data in table 222 is stored as a part of a set of customer, ticket and product data maintained for use by priority score determination module 216. Sentiment values may also be stored with other ticket history data in associated information stores 230 in some embodiments. Priority score data 224 is a data structure storing a correspondence between pending support request tickets and their priority scores, as determined by priority score determination module 216. In an embodiment, data 224 includes an identifier for each pending support request ticket and the corresponding priority score for each identifier. Priority score data 224 can be used to create an ordered list of pending support request tickets to be used by support personnel in resolving the tickets. In some embodiments priority scores determined by module 216 are sent to a different server for storage, such as a separate server used by support personnel. In such an embodiment, priority score data 224 would not necessarily be maintained within system 108.

In the embodiment of FIG. 2, request prioritization system 108 is connected to and utilizes data from associated information stores 230. Associated information stores 230 includes databases or other data structures maintained by the provider operating request prioritization system 108, where the databases contain information associated with one or more support request tickets. In the embodiment of FIG. 2, data stores 230 include a ticket history database 232, customer information database 234, product information database 236, financial/contracts database 238, marketing/media database 240 and support capability database 242. In this embodiment, ticket history database 232 maintains a record of ticket support requests received. In a further embodiment, each historical ticket support request includes data documenting the handling of the support request, and may also include review or survey responses from the submitter of the support request evaluating the handling of the request. Customer information database 234 can store all kinds of customer information, such as: a number of the provider's products or services in use by each customer, or install base; data of previous interactions with each customer, including sentiment data for the interactions; customer size data; customer role data (e.g. product reviewing organization, educational institution, etc.); customer purchase timing data; customer satisfaction data. Product information database 236 can store all kinds of data on the providers' products or services, such as: problem/support data for each product or service; life cycle information; support level information; warranty information; product/service market share information.

Financial/contracts database 238 can store customer related information including service level agreements and contracts for products or services. Some or all of this financial information is likely to be sensitive and not accessible by customer support personnel. Contract-related information may also have strong time-dependent features such as contract renewal dates. Marketing/media database 240 can store marketing and media related information, including information obtained from social media. Stored information may include, without limitation, promotions information affecting customer decision timing and customer satisfaction as expressed in surveys or on social media. Support capability database 242 can store information such as a current number of available support personnel, skill level of available support personnel, specific product or problem experience levels of available support personnel, and number of support request tickets pending. The above allocation of subject matter between databases in associated information stores 230 is merely an illustrative example, and it will be understood in view of this disclosure that there are cross-references between the types of information described, and the subject matter could be distributed differently among the databases shown. In other embodiments, more or fewer types of information can be included in associated information stores 230, and the information can be stored in more or fewer separate databases than shown in the embodiment of FIG. 2.

Various kinds of information may be associated with a support request ticket. As an example, an incoming support request ticket may contain information including, but not limited to: an identifier of the customer (or other entity) submitting the support request ticket, an identifier of a product or service that support is requested for, a description of the problem associated with the ticket and a date and time of ticket submission. In this example, information associated with the support request ticket could be information regarding the customer submitting the ticket, including but not limited to the amount of business done with that customer, the status of ongoing contract negotiations with the customer, amount of industry influence by the customer, the number of previous support tickets submitted by the customer, the average time needed to resolve previous support requests from the customer, and any service level agreements with the customer. Information associated with the support request ticket could also be information regarding the product or service identified in the ticket, including but not limited to a quantity of that product or service purchased by the customer, a number of support requests submitted historically for the product or service (from this customer and/or from all customers), and a current availability of support personnel with expertise regarding the product or service. The above is merely an example, and it will be understood in view of this disclosure that multiple other types of information may be associated with a support request ticket in embodiments of the systems and methods described herein.

Further alternatives and variations of request prioritization system 108 will be apparent to one of ordinary skill in the art in view of this disclosure. For example, some or all of the modules depicted within memory 206 may be implemented using separate servers as part of a server system like system 110 of FIG. 1. Data depicted within data storage 208 may also be associated with one or more separate servers. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

For ease of discussion, a device or module may be referred to as, for example, "performing," "accomplishing," or "carrying out" a function or process. The unit may be implemented in hardware and/or software. However, as will be evident to one skilled in the art, such performance can be technically accomplished by one or more hardware processors, software, or other program code executed by the processor, as may be appropriate to the given implementation. The program execution could, in such implementations, thus cause the processor to perform the tasks or steps instructed by the software to accomplish the desired functionality or result. However, for the sake of convenience, in the discussion below, a processor or software component may be interchangeably considered as an "actor" performing the task or action described, without technically dissecting the underlying software execution mechanism.

Figure 3:
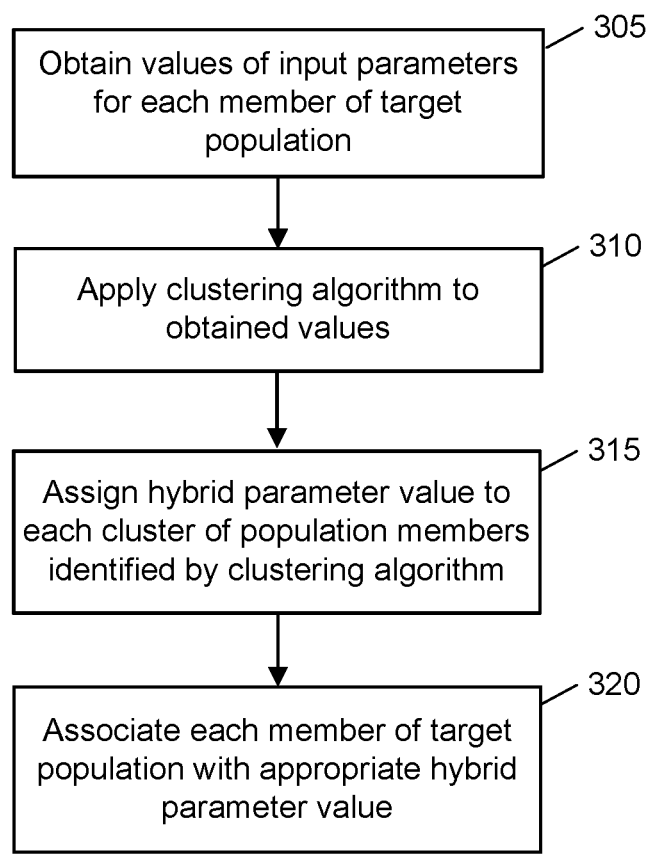
FIG. 3 is a flow chart illustrating certain aspects of a method for using a clustering algorithm to assign a hybrid parameter value, according to an embodiment of the present disclosure.

A flow chart illustrating an example of a method for assigning a hybrid parameter value is shown in FIG. 3. In an embodiment, method 300 is performed by a clustering module such as module 212 of FIG. 2. Method 300 begins, in step 305, with obtaining values of input parameters for each member of a target population. The target population is the population to be described by the hybrid parameter. In an embodiment, the target population is customers that have submitted service request tickets (or a subset of such customers). In alternative embodiments, the target population could be, for example, service request tickets or products involved in service request tickets or problems described in service request tickets. The input parameters are parameters describing the target population. In an embodiment, input parameter values are retrieved from associated information stores 230. In one embodiment for which the target population is customers, input parameter values retrieved from databases within associated information stores 230 for each customer in the target population include: a customer number for the customer, a customer category parameter, ticket identifiers for tickets submitted by the customer, issue description parameters for tickets submitted by the customer, created and closed dates for tickets submitted by the customer, severity parameters for tickets submitted by the customer, product identifiers for products in use by the customer, locations of products in use by the customer, value of products in use by the customer and parameters reflecting a degree of problems or malfunctions with products in use by the customer. This embodiment is merely an example, and any available parameter values of interest could be used as input parameter values in other embodiments.

Method 300 continues in step 310 with applying a clustering algorithm to the obtained input parameter values. Multiple clustering algorithms are available and continue to be developed, as will be understood by one of ordinary skill in the art of data analysis. In an embodiment, a density based clustering algorithm such as Density-Based Spatial Clustering of Applications with Noise (DBSCAN) is used. Other clustering algorithms may also be suitable, depending upon the distribution of the input parameter values, including but not limited to mean shift algorithms, partitioning based algorithms such as k-means and Gaussian Mixture Models (GMMs), or hierarchical or connectivity-based clustering algorithms, such as hierarchical agglomerative clustering (HAC).

In step 315 of method 300, a hybrid parameter value is assigned to each cluster of population members identified by the clustering algorithm. In an embodiment, hybrid parameter values are assigned by a developer of clustering module 212 based on relative values of the input parameters for each identified cluster. As an example, consider an importance or urgency related hybrid parameter derived based on input parameters relating to a frequency of problems with the customer's products and a size or significance of the customer overall. In an embodiment for which three clusters of customers are identified by the clustering algorithm, a highest value of the hybrid parameter might be assigned to a cluster of customers reflecting both relatively high problem frequency and relatively high size/significance as compared to customers in the other two clusters. A middle value of the hybrid parameter might be assigned to a cluster of customers reflecting a medium problem frequency and a lower size/significance as comparted to customers in the other two clusters, with a lowest value of the hybrid parameter assigned to a cluster of customers reflecting a lowest problem frequency. Method 300 ends in step 320 with associating each member of the target population with the appropriate assigned hybrid parameter value. In an embodiment, the member of the target population is associated with its hybrid parameter value by storing the hybrid parameter values in a data structure relating the population members and corresponding hybrid parameter values. In a further embodiment, the hybrid parameter data is stored in hybrid parameter table 220 of FIG. 2, or in some other data structure that can be accessed by priority score determination module 216.

For embodiments in which hybrid parameter values are used by priority score determination module 216 in generating a priority score, assignment of hybrid parameter values using method 300 is carried out prior to use of system 108 for generation of a priority score for an incoming support request ticket. When a new support request ticket is received, pre-assigned values of any hybrid parameters corresponding to the new ticket are retrieved from a data structure such as hybrid parameter table 220 for use in generating a priority score for the new ticket. In order to account for changes over time in the underlying data (including, for example, new support request tickets processed, new product purchases by customers, or time-dependent events like sales promotions or contract negotiations), method 300 is repeated from time to time in order to generate updated hybrid parameter values. In an embodiment, the method is repeated on a regular schedule, such as once per day or once per week. Operation of clustering module 212 may be tuned or optimized over time in some embodiments, in ways including, but not limited to, selection of input parameters used to describe the target population, selection of clustering algorithm, or selection of model parameters for the clustering algorithm used. In further embodiments, such tuning or optimization is done in conjunction with tuning or optimization of the machine learning model used by priority score determination module 216, with a goal of optimizing a performance metric such as customer satisfaction.

Figure 4:
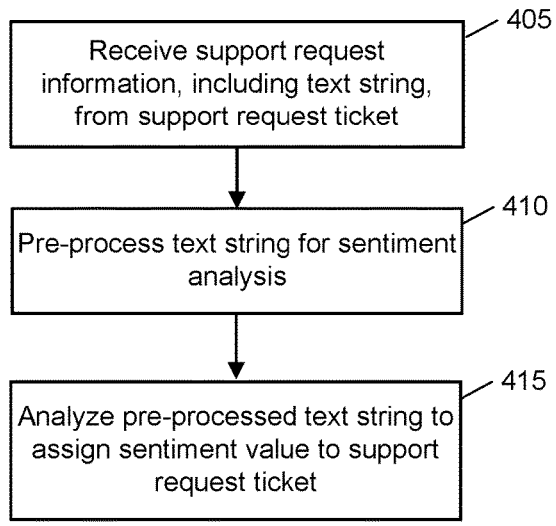
FIG. 4 is a flow chart illustrating certain aspects of a method for assigning a sentiment value to a support request ticket, according to an embodiment of the present disclosure.

A flow chart illustrating an example of a method for assigning a sentiment value to a support request ticket is shown in FIG. 4. In an embodiment, method 400 of FIG. 4 is performed by a sentiment analysis module such as module 214 of FIG. 2. Method 400 begins in step 405 with receiving support request information, including a text string, where the support request information is from a support request ticket. In an embodiment, the received text string includes all of the text within the support request ticket. In other embodiments, the received text string includes text from one or more selected fields of the support request ticket. Method 400 continues in step 410 with pre-processing the text string for sentiment analysis. In an embodiment, pre-processing of the text string is done using natural language processing module 226, and includes one or more typical natural language processing operations. Such natural language processing operations include, without limitation, breaking the text string into words or phrases (tokenization), removing punctuation and words not relevant to sentiment analysis such as "stop words," converting words to a root form by stemming or lemmatization, tagging words by part of speech, grammatical analysis such as dependency parsing, and recognizing proper names (named entity recognition). In a further embodiment, step 410 includes, subsequent to carrying out one or more natural language processing operations as discussed above, expressing the processed text string numerically in a data structure for use by a machine learning model (vectorization).

Method 400 continues in step 415 with analysis of the pre-processed text string to assign a sentiment value to the support request ticket. In an embodiment, the analysis is carried out using a machine learning classification algorithm such as algorithm 228 of FIG. 2. In a further embodiment, classification algorithm 228 is used to implement a supervised learning model, using sets of previously-resolved support request tickets as development and training data. Classification algorithm 228 includes a gradient boosted decision tree algorithm in one embodiment. Other types of supervised learning algorithms, such as support vector, random forest or K nearest neighbor algorithms, can also be used in other embodiments. In still other embodiments, the analysis of step 415 may be implemented with an alternative approach, such as a rules-based approach using a lexicon, or dictionary, rather than with a machine learning model.

In an embodiment of a machine learning approach, a machine learning model using classification algorithm 228 builds a dictionary of sentiment-related words within the model. In an embodiment, analysis using a dictionary involves tallying sentiment scores assigned to sentiment-related words within the text string and sorting the resulting aggregate sentiment scores into ranges corresponding to the assigned sentiment values. In one embodiment, one of three sentiment values such as "happy", "sad" and "average" is assigned to the analyzed support request ticket. Different numbers of sentiment values and different value labels can be used in other embodiments. In an embodiment, a correspondence between the support request ticket and its assigned sentiment value is stored in a data structure such as sentiment table 222 of FIG. 2, or in some other data structure that can be accessed by priority score determination module 216.

Figure 5:
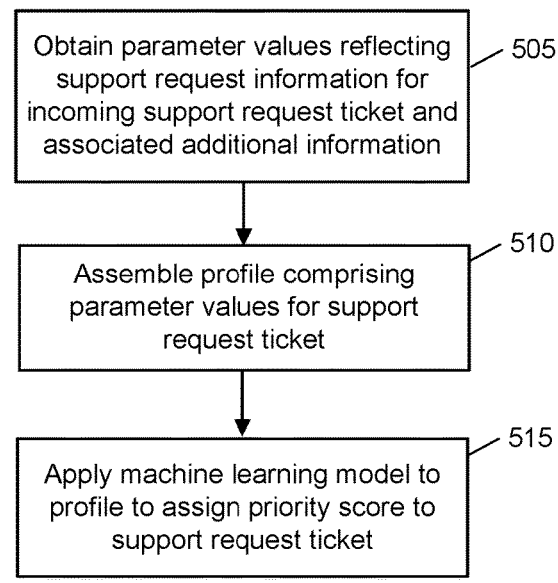
FIG. 5 is a flow chart illustrating certain aspects of a method for assigning a priority score to a support request ticket, according to an embodiment of the present disclosure.

A flow chart illustrating an example of a method for determining a priority score for a support request ticket is shown in FIG. 5. In an embodiment, method 500 of FIG. 5 is performed by a priority score determination module such as module 216 of FIG. 2. Method 500 begins in step 505 with obtaining parameter values reflecting support request information for an incoming support request ticket and additional information associated with the support request ticket. The support request information is information extracted from within the incoming support request ticket. An incoming support request ticket may also be referred to herein as a pending support request ticket or document, where a pending ticket is a received ticket that has not been resolved, or closed. Support request information from a pending support request ticket may be referred to herein as current support request information. In an embodiment, parameter values reflecting the support request information include a sentiment value for the support request ticket, as described above in connection with FIGS. 2 and 4. Parameter values reflecting the support request information can also include a hybrid parameter value as described above in connection with FIGS. 2 and 3. In a further embodiment, parameter values reflecting the support request information include one or more of a ticket identifier, a customer identifier, a product identifier, an issue identifier, an issue severity identifier or any other value of interest found in or derived from information in the support request ticket.

The additional information associated with the support request ticket includes information retrieved from information stores such as associated information stores 230 of FIG. 2. In an embodiment, the associated additional information is stored in one or more data structures within request prioritization system 108, having been retrieved from information stores 230 during a most recent update or rebuilding of the machine learning model used by priority score determination module 216. Additional information associated with a pending support request ticket may also be referred to herein as current additional information. The associated additional information includes information regarding parameter values from the support request information, such as information regarding the customer submitting the support request ticket, a product identified in the support request ticket or an issue identified in the support request ticket. In an embodiment, parameter values reflecting the associated additional information include a hybrid parameter value as described above in connection with FIGS. 2 and 3. Parameter values reflecting the associated additional information may also include sentiment values, as described in connection with FIGS. 2 and 4 above, for previously-resolved, or historical, support request tickets. In a further embodiment, parameter values reflecting the associated additional information include one or more of any parameter values included in previously-resolved support request tickets involving the same customer, the same product, or the same issue or problem as the incoming support request ticket. Such parameters can include any of the quantities described above in connection with the contents of databases within associated information stores 230, or any other values of interest found in or derived from information associated with the incoming support request ticket. Information from within previously-resolved support request tickets may be referred to herein as previous support request information, and additional information associated with previously resolved support request tickets may be referred to as previous additional information.

Method 500 continues in step 510 with assembling a profile for the support request ticket, where the profile includes the set of parameter values obtained in step 505. In an embodiment, assembling the profile includes associating the set of parameter values with the support request ticket by storing in a data structure a correspondence between the set of parameter values and the ticket. In step 515 of method 500, a machine learning model is applied to the profile assembled in step 510, to assign a priority score to the support request ticket. In an embodiment, the machine learning model is a supervised learning model in which profiles for historical support request tickets are used as training data. In a further embodiment, the machine learning model comprises a neural network using long short-term memory (LSTM) units. Other machine learning models can be used, however, as will be recognized by one of ordinary skill in art of machine learning in view of this disclosure. Operation of priority score determination module 214 is tuned or optimized over time in some embodiments, in ways including, but not limited to, selection of parameters used in forming the profile or selection of parameters, such as weighting coefficients, for the machine learning model. In a further embodiment, such tuning or optimization is done with a goal of optimizing a performance metric such as customer satisfaction. Tuning or optimization may be done in conjunction with tuning or optimization of other modules in request prioritization system 108, such as clustering module 212.

Figure 6A:
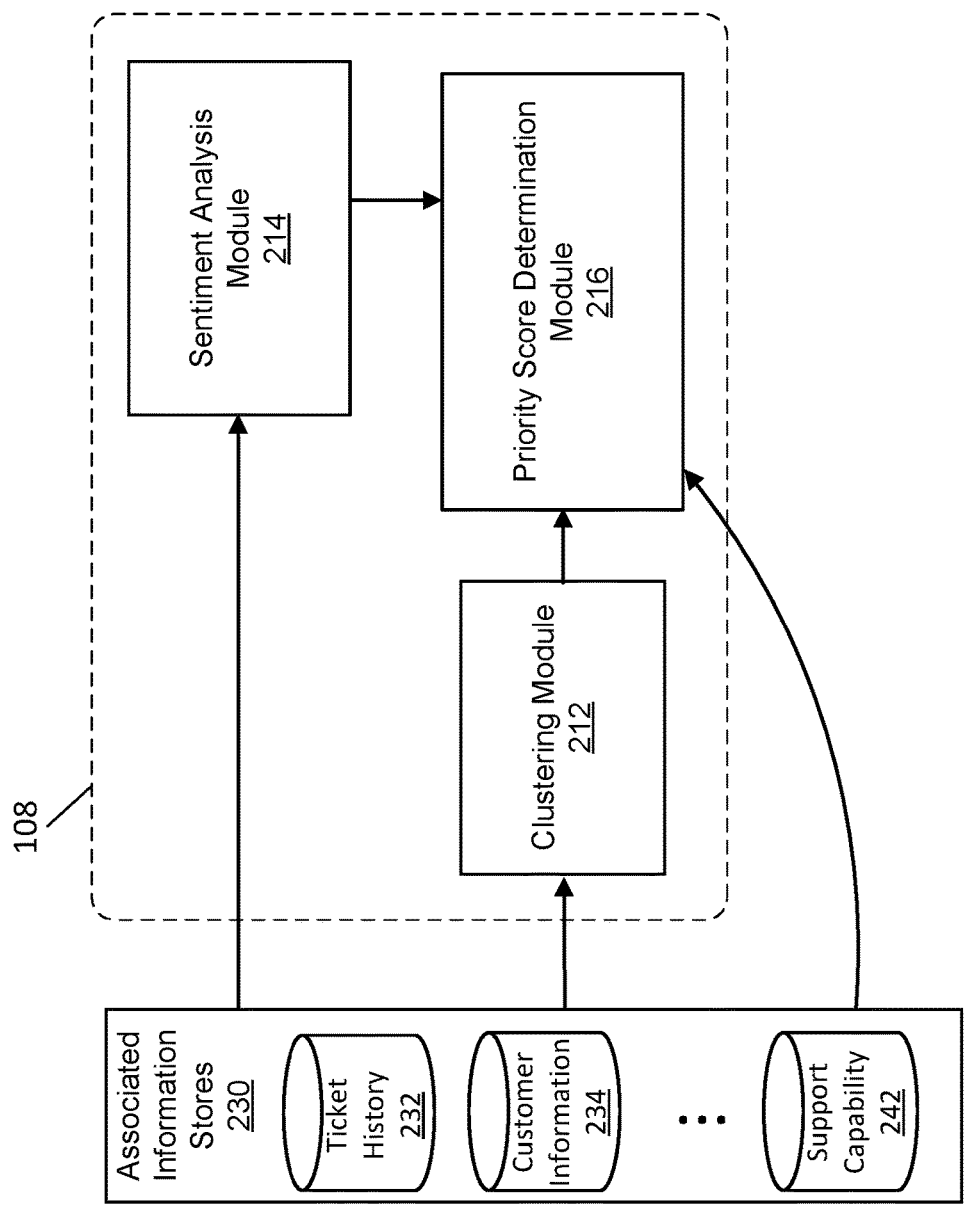
FIG. 6A is a data flow diagram illustrating an embodiment of a request prioritization system in a building or updating mode.

A simplified data flow diagram illustrating a building or updating mode of request prioritization system 108 is shown in FIG. 6A. Some of the databases within associated information stores 230 as shown in FIG. 2 are designated by an ellipsis ( . . . ) in the corresponding element of FIG. 6A for simplification of the drawing. The arrows in FIG. 6A show that data from associated information stores 230 is used by sentiment analysis module 214, clustering module 212 and priority score determination module 216 of request prioritization system 108. In an embodiment, data from information stores 230 used by sentiment analysis module 214 is from ticket history database 232 and is used for training a machine learning classification model used by sentiment analysis module 214. Clustering module 212 may use data from multiple databases in information stores 230, depending on the input parameters used in generating hybrid parameter values. Data from multiple database in information stores 230 is used by priority score determination module 216 in assembling profiles for previously-resolved support request tickets. In an embodiment, such profiles from previously-resolved support request tickets, or historical support request tickets, are used in training the machine learning model used to determine a priority score for a support request ticket. In an embodiment, priority score determination model 216 stores ticket profile data in a data structure comprising rows or records containing the parameter values, where the parameter values stored in the data structure are arranged into columns representing the respective parameters. In a further embodiment, each record within the data structure corresponds to a respective support request ticket. Sentiment values assigned by sentiment analysis module 214 and hybrid parameter values assigned by clustering module 212 are accessed by priority score determination module 216.

After request prioritization system 108 is operational and processing incoming support request tickets, the models within system 108 are updated from time to time to account for changes over time in the data within information stores 230. In an embodiment of such an update, clustering module 212 obtains updated input parameter values and re-executes its clustering algorithm over the target population (of customers, for example); new members of the target population may also be added during the update as a result, for example, of new support request tickets that have been added to ticket history database 232 since the immediately preceding update. In a further embodiment, parameter values stored by priority score determination module 216 are updated with corresponding values from associated information stores 230 that have changed since the immediately preceding update. In some embodiments, one or both of the machine learning models used by sentiment analysis module 214 or priority score determination module 216 may be further trained using updated data from associated information stores 230. Updating of the models is in some embodiments performed on a regular schedule, such as once daily or once weekly. Updating of the models is believed to improve the accuracy of the priority score, in addition to allowing for inclusion of time-dependent parameters such as upcoming contract negotiation and renewal dates.

Figure 6B:
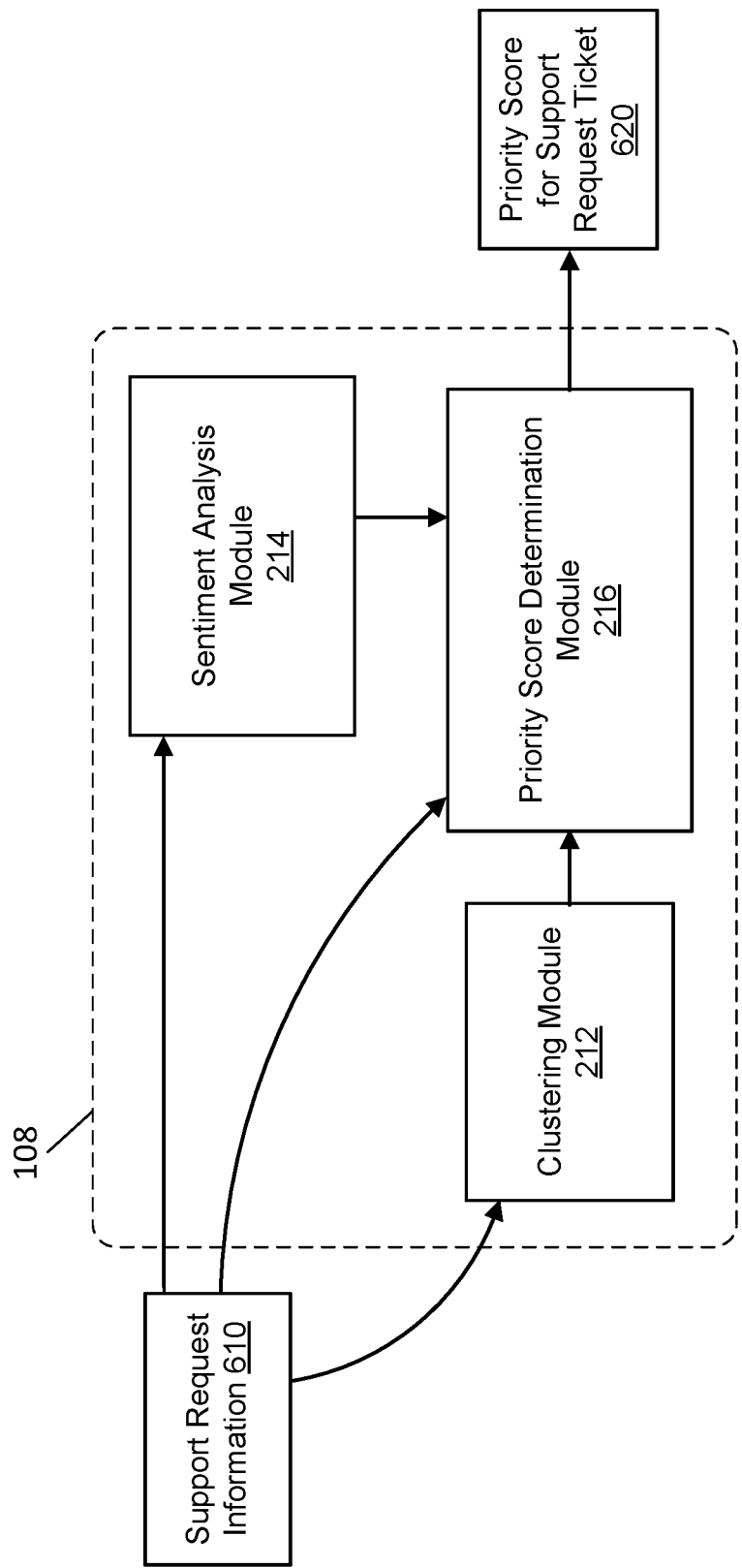
FIG. 6B is a data flow diagram illustrating an embodiment of a request prioritization system in an operation mode.

A simplified data flow diagram illustrating an operation mode of request prioritization system 108 is shown in FIG. 6B. When system 108 is in operation mode, support request information 610 from an incoming support request ticket is received, and a priority score 620 is produced. In the embodiment of FIG. 6B, additional information associated with the incoming support ticket, such as information regarding the customer submitting the ticket, is already stored by priority score determination module 216 and therefore does not need to be retrieved from information stores 230 during the operation mode of system 108. In alternative embodiments, some or all of the parameter values reflecting additional information associated with the incoming ticket could be retrieved from information stores 230. The arrows show that in the embodiment of FIG. 6B, support request information 610 from the incoming support request ticket is used by sentiment analysis module 214, clustering module 212 and priority score determination module 216.

As described further above in connection with FIG. 4, sentiment analysis module 214 uses a text string from support request information 610 to assign a sentiment value to the incoming support request ticket and provide the sentiment value to priority score determination module 216. In an embodiment, clustering module 212 uses a data value from support request information 610 to determine a value of a hybrid parameter to assign to the incoming support request ticket. For example, if clustering module 212 has generated a hybrid parameter assigned to customers, a customer identifier from support request information 610 is used to look up the appropriate value of the hybrid parameter, which is provided to priority score determination module 216. In an alternative embodiment, assignment of the hybrid parameter to the incoming ticket could be performed by priority score determination module 216, by accessing hybrid parameter values previously generated by clustering module 212. In such an embodiment, support request information 610 would not need to be provided to clustering module 212 during operation of system 108. Priority score determination module 216 uses parameter values within support request information 610 in assembling a profile for the incoming support request ticket. The profile is fed to a machine learning model that determines priority score 620 for the support request ticket. The priority score can then be used to form a prioritized list of pending support tickets that support personnel can address in order of priority.

The request prioritization system and methods disclosed herein result in a faster and more accurate prioritization of pending support request tickets. The disclosed system can consider information not available to support request personnel performing manual prioritization. The timely and accurate prioritization provided by the disclosed system may provide increased efficiency in use of system resources such as queue memory and communication bandwidth. Additional memory space may be needed when support tickets stay in a queue longer than necessary because of an initial prioritization error. Additional communication traffic may be required when a ticket is initially mis-prioritized and subsequently has to be moved to a different level of support personnel in an attempt to correct the priority sequence.

Figure 7:
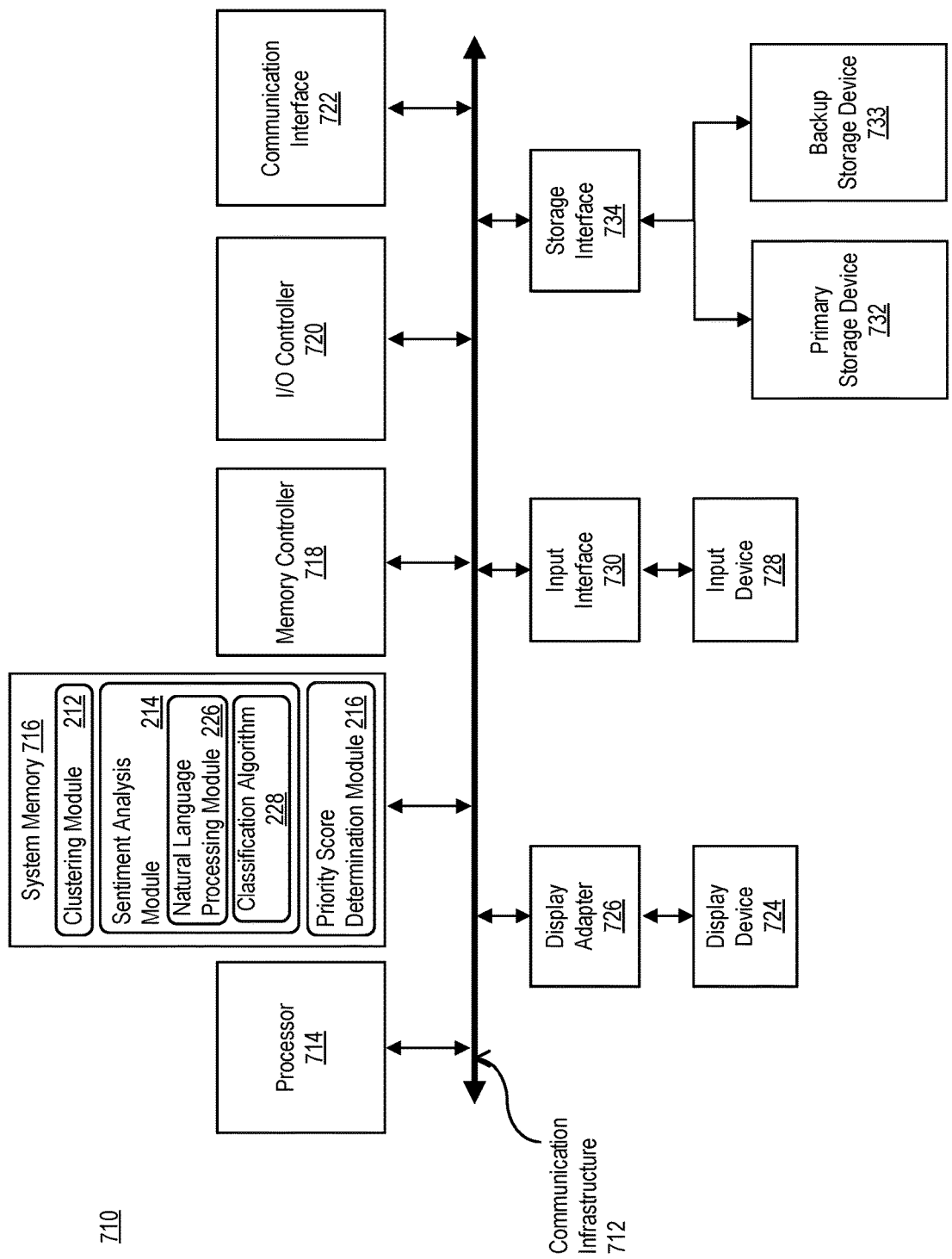
FIG. 7 is a block diagram illustrating an information handling system, according to an embodiment of the present disclosure.

FIG. 7 depicts a block diagram of an information handling system 710 suitable for implementing aspects of the systems described herein. In the embodiment of FIG. 7, computing system 710 implements request prioritization system 108. Embodiments of the computing system of FIG. 7 can, alternatively or in addition, implement various other engines and modules described in this disclosure. Computing system 710 broadly represents any single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 710 may include at least one processor 714 and a system memory 716. By executing the software that implements request prioritization system 108, computing system 710 becomes a special purpose computing device that is configured to perform database fragmentation detection and repair in manners described elsewhere in this disclosure.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 710 may include both a volatile memory unit (such as, for example, system memory 716) and a non-volatile storage device (such as, for example, primary storage device 732, as described further below). In one example, program instructions executable to implement a clustering module 212, sentiment analysis module 214 and priority score determination module 216 may be loaded into system memory 716.

In certain embodiments, computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the operations or features described and/or illustrated herein. I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724. Computing system 710 may also include at least one input device 728 coupled to communication infrastructure 712 via an input interface 730. Input device 728 generally represents any type or form of input device capable of providing input, either computer or human generated, to computing system 710. Examples of input device 728 include, without limitation, a keyboard, a pointing device, a speech recognition device, or any other input device.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may include a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. A storage device like primary storage device 732 can store information such as routing tables and forwarding tables.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may be a part of computing system 710 or may in some embodiments be separate devices accessed through other interface systems. Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7.

Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium. The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 710 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method, comprising
receiving current support request information, where the current support request information is contained within a pending support request document;

accessing current additional information associated with the pending support request document;

associating a set of parameter values with the pending support request document, wherein the parameter values in the set of parameter values are based on information within one or both of the current support request information or the current additional information, wherein associating the set of parameter values comprises applying natural language processing to a text string within the pending support request document, and applying a machine learning classification model to a result of the natural language processing;

training the machine learning classification model using previous support request information and previous additional information associated with previously-resolved support request documents;

assigning sentiment values for the pending support request document, by a sentiment analysis module using the machine learning classification model, wherein the set of parameter values comprises the sentiment values, and wherein the set of parameter values comprises a sentiment value for the pending support request document;

determining a priority score corresponding to the set of parameter values, wherein determining the priority score comprises applying a machine learning model developed using the previous support request information and the previous additional information associated with the previously-resolved support request documents; and assigning the priority score to the pending support request document.

2. The method of claim 1, further comprising:

comparing the priority score to additional priority scores assigned to respective additional pending support request documents;

based on a result of the comparing, establishing a priority sequence for response to the pending support request document and the additional pending support request documents; and sending the pending support request document and the additional pending support request documents to one or more client information handling systems for response, according to the priority sequence.

3. The method of claim 1, wherein the set of parameter values comprises a hybrid parameter value; and associating the set of parameter values comprises accessing results of a clustering algorithm to obtain the hybrid parameter value.

4. The method of claim 1, wherein the machine learning model comprises a neural network.

5. The method of claim 1, wherein the current additional information comprises information retrieved from one or more data stores during an update of the machine learning model.

6. An information handling system, comprising:

one or more processors;

one or more non-transitory computer-readable storage media coupled to the one or more processors; and a plurality of instructions, encoded in the one or more computer-readable storage media and configured to cause the one or more processors to receive current support request information, where the current support request information is contained within a pending support request document;

access current additional information associated with the pending support request document;

associate a set of parameter values with the pending support request document, wherein the parameter values in the set of parameter values are based on information within one or both of the current support request information or the current additional information, wherein associating the set of parameter values comprises applying natural language processing to a text string within the pending support request document, and applying a machine learning classification model to a result of the natural language processing;

train the machine learning classification model using previous support request information and previous additional information associated with previously-resolved support request documents;

assign sentiment values for the pending support request document, by a sentiment analysis module using the machine learning classification model, wherein the set of parameter values comprises the sentiment values, and wherein the set of parameter values comprises a sentiment value for the pending support request document;

determine a priority score corresponding to the set of parameter values, including applying a machine learning model developed using the previous support request information and the previous additional information associated with the previously-resolved support request documents; and assign the priority score to the support request document.

7. The information handling system of claim 6, wherein the plurality of instructions is further configured to cause the one or more processors to:

compare the priority score to additional priority scores assigned to respective additional pending support request documents;

based on a result of the comparing, establish a priority sequence for response to the pending support request document and the additional pending support request documents; and send the pending support request document and the additional pending support request documents to one or more client information handling systems for response, according to the priority sequence.

8. The information handling system of claim 6, wherein the set of parameter values comprises a hybrid parameter value; and the plurality of instructions is further configured to cause the one or more processors to access results of a clustering algorithm to obtain the hybrid parameter value, as a part of associating the set of parameter values with the pending support request document.

9. The information handling system of claim 6, wherein the machine learning model comprises a neural network.

10. The information handling system of claim 6, wherein the current additional information comprises information retrieved from one or more data stores during an update of the machine learning model.

11. A non-transitory computer readable storage medium having program instructions encoded therein, wherein the program instructions are executable to:

receive current support request information, where the current support request information is contained within a pending support request document;

access current additional information associated with the pending support request document;

associate a set of parameter values with the pending support request document, wherein the parameter values in the set of parameter values are based on information within one or both of the current support request information or the current additional information, wherein associating the set of parameter values comprises applying natural language processing to a text string within the pending support request document, and applying a machine learning classification model to a result of the natural language processing;

train the machine learning classification model using previous support request information and previous additional information associated with previously-resolved support request documents;

assign sentiment values for the pending support request document, by a sentiment analysis module using the machine learning classification model, wherein the set of parameter values comprises the sentiment values, and wherein the set of parameter values comprises a sentiment value for the pending support request document;

determine a priority score corresponding to the set of parameter values, including applying a machine learning model developed using the previous support request information and the previous additional information associated with the previously-resolved support request documents; and assign the priority score to the support request document.

12. The computer readable storage medium of claim 11, wherein the program instructions are further executable to:

compare the priority score to additional priority scores assigned to respective additional pending support request documents;

based on a result of the comparing, establish a priority sequence for response to the pending support request document and the additional pending support request documents; and send the pending support request document and the additional pending support request documents to one or more client information handling systems for response, according to the priority sequence.

13. The computer readable storage medium of claim 11, wherein the set of parameter values comprises a hybrid parameter value; and the instructions are further executable to access results of a clustering algorithm to obtain the hybrid parameter value, as a part of associating the set of parameter values with the pending support request document.

14. The computer readable storage medium of claim 11, wherein the current additional information comprises information retrieved from one or more data stores during an update of the machine learning model.

* * * * *